Nov. 20, 1928.
L. D. SOUBIER
1,692,589
METHOD AND APPARATUS FOR PRODUCING CHARGES OF MOLTEN GLASS
Filed March 22, 1926    2 Sheets-Sheet 1
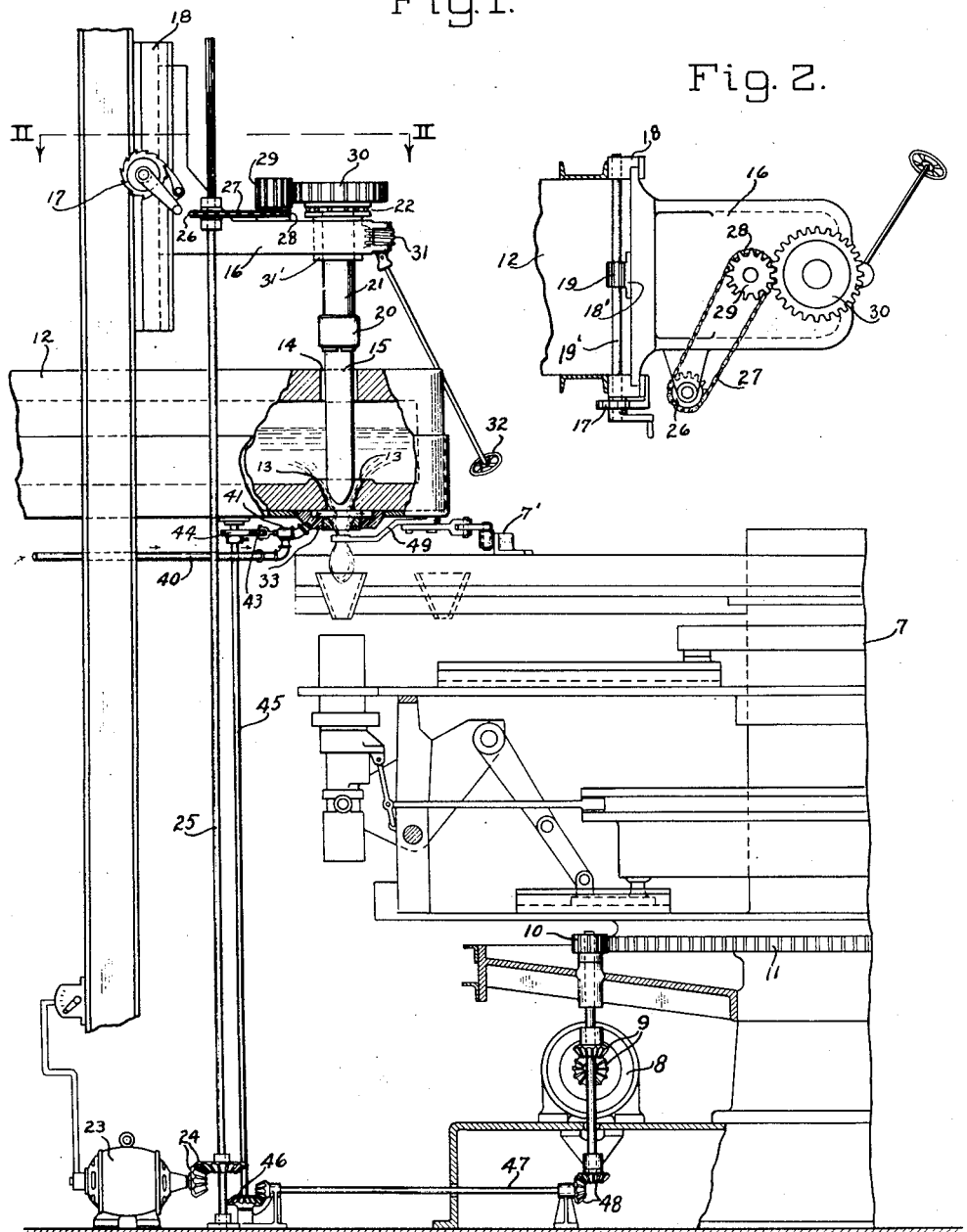
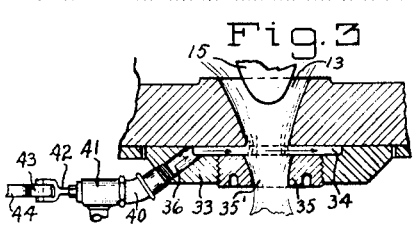
INVENTOR
Leonard D. Soubier
BY
J. F. Rule.
HIS ATTORNEY Nov. 20, 1928.
L. D. SOUBIER
1,692,589
METHOD AND APPARATUS FOR PRODUCING CHARGES OF MOLTEN GLASS
Filed March 22, 1926 2 Sheets-Sheet 2
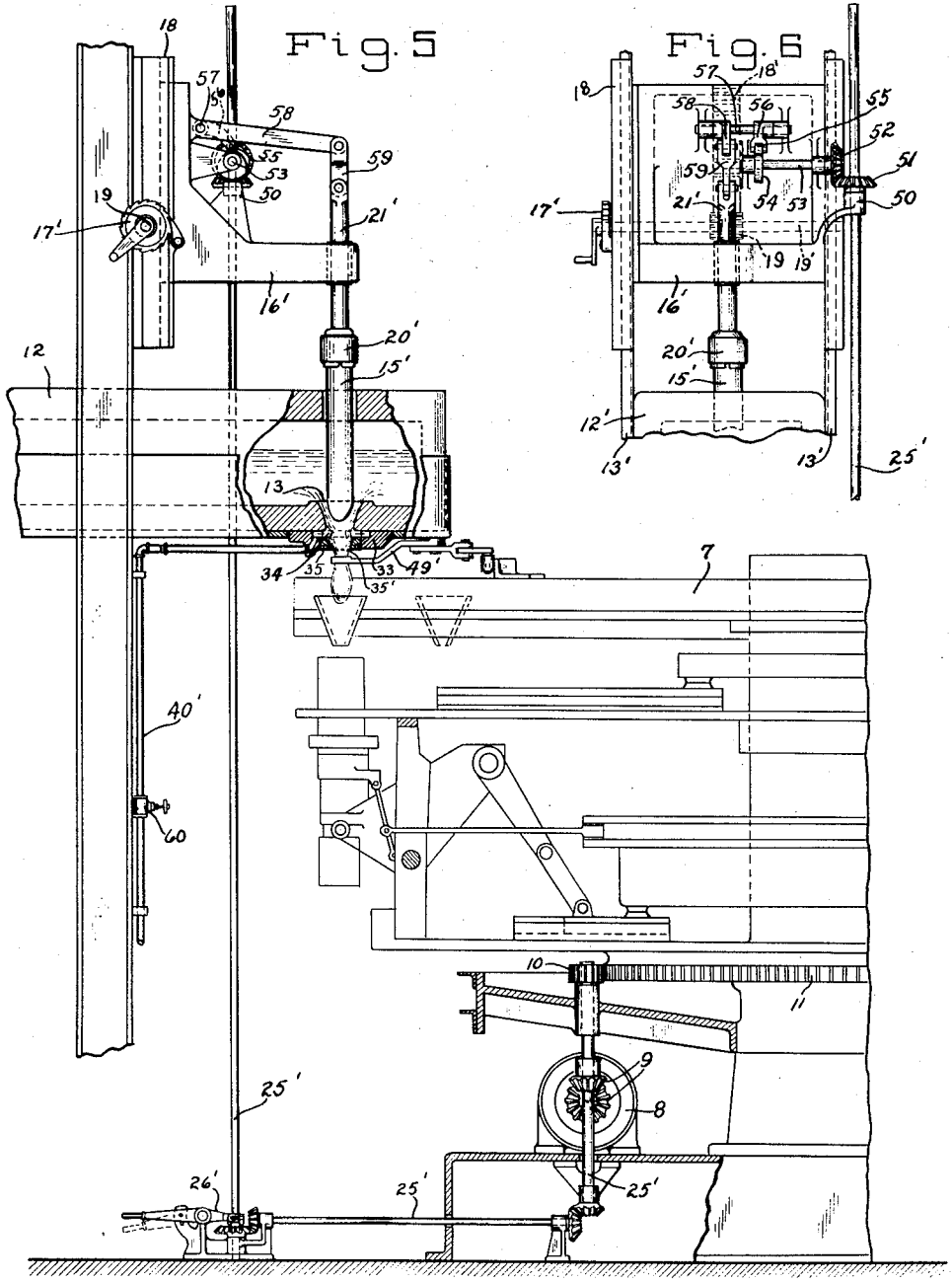
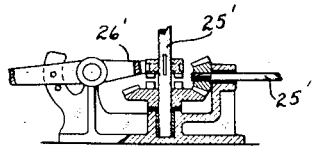
INVENTOR
Leonard D. Soubier
BY
J. F. Rule
HIS ATTORNEY.

Patented Nov. 20, 1928.

1,692,589

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

METHOD AND APPARATUS FOR PRODUCING CHARGES OF MOLTEN GLASS.

Application filed March 22, 1926. Serial No. 96,497.

My invention comprises an improved method and apparatus for producing suspended charges or gobs of molten glass, in which the glass is permitted to issue from the outlet of a container while at a substantially higher temperature and in a more fluent condition than is possible by methods heretofore used.

This result is attained in the present invention by cooling the outer surface or layer of an issuing column of glass so rapidly and to such an extent that it forms an encasing sack by which the charge of glass is suspended from the walls of the discharge outlet while the main body within the sack and forming a major portion of the charge, is still in a comparatively liquid condition such that it could not be suspended from the outlet walls in the absence of the support provided by the enveloping film or layer of chilled glass. The charge or gob of glass when severed and dropped into a mold in the condition just described, is better adapted to conform to the shape of the mold and may be blown to hollow form by the use of air at a considerably lower pressure than is necessary with mold charges as usually formed and which are of a more nearly uniform temperature and consistency throughout.

A further object of the invention is to provide a method and apparatus through the utilization of which, the necessity of using boots of varying lengths in connection with feeding of glass for the production of different sized ware, may be materially reduced or entirely eliminated.

It is also an object of the present invention to provide a method and apparatus employing pneumatic means for causing periodic retardation of glass flow through a discharge outlet in order that suspended gobs of predetermined size and weight may be formed for delivery to molds, such retardation being effected by a periodic increase of pneumatic pressure across the path of discharge of glass from the outlet.

Other objects will be apparent hereinafter.

In the accompanying drawings:

Fig. 1 is an elevation of a glass blowing machine and feeder, portions of the latter being broken away and in section, showing my invention applied thereto.

Fig. 2 is a top plan view of the plunger elevating and rotating mechanism.

Fig. 3 is a detail transverse sectional view of the lower portion of a feeder showing my invention applied thereto.

Fig. 4 is a fragmentary plan view disclosing the inlet and outlet to and from the chamber formed in the bushing ring or support.

Fig. 5 is an elevation similar to Fig. 1, but showing my invention in association with a reciprocable plunger.

Fig. 6 is a fragmentary front elevation illustrating means for reciprocating the feed control plunger.

Fig. 7 is a detail, partly in section, showing the clutch control for a reciprocating mechanism.

The form of my invention illlustrated in Figs. 1 to 4 inclusive, broadly comprises the combination of a forming machine; feeding mechanism having a submerged discharge outlet for molten glass; a common means for cooling the surface of an issuing column of glass and periodically retarding flow of glass; and additional means for severing gobs of surface chilled portions from the issued column during the period of retardation.

While other types of forming machines may well be employed in connection with my invention, I have illustrated a type comprising a rotary mold carriage 7, receiving its rotary movement from an electric motor 8 by way of bevel gears 9, and a spur gear 10 whose teeth mesh with those of a ring gear 11 fixed to and for rotation with the lower portion of said rotary carriage.

Arranged above and in proximity to the rotary mold carriage 7, is a conventional or any preferred type of boot or forehearth 12, the latter being formed with a submerged discharge orifice or outlet 13 with which the molds of the forming machine are successively axially aligned for the reception of gobs or charges of molten glass issuing through said orifice. The cover of the boot 12 is provided with an opening 14 axially aligned with the discharge orifice 13, allowing adjustable insertion of a plug or plunger 15 whose lower end projects into the discharge orifice 13 a distance determined by the condition of the glass and size of suspended gobs desired. This plunger 15 is rotatably suspended from a carrying bracket 16, the latter having vertical adjustable connection with supporting guide bars 18 and adapted to be held at any preferred elevation by means of pawl and ratchet mechanism 17. It will be noted by reference to Fig. 2, that the inner end of this bracket 16 carries a vertical rack bar 18' whose teeth mesh with those of a gear 19 mounted intermediate the ends of a transverse shaft 19' which is rotatable by means of a handle arranged adjacent the pawl and ratchet mechanism 17. By manipulating the mechanism just described, the bracket 16 may be elevated sufficiently to carry the lower end of the plunger above the opening 14, whereby removal of the plunger may be readily effected.

The plunger 15 has its upper end removably mounted in a chuck 20, from which rises a post or stem 21, the upper end of the latter having an annual radial flange spaced upwardly from a second radial flange by bearing balls, thereby forming thrust bearing 22. The second named annular flange is formed upon the upper end of a sleeve 31' which surrounds the upper portion of the post or stem 21, such sleeve being extended through the carrying bracket 16 and non-rotatably mounted in the latter. This sleeve 31', as will be noted by reference to Fig. 1, supports the plug or plunger 15 and may be adjusted upwardly or downwardly in the bracket 16 as circumstances require, such adjustment being possible, due to the formation of a worm gear segment upon the sleeve, and coaction with the gear of a worm 31 which is manually rotated by a hand wheel 32. This mechanism quite obviously provides accurate adjustment of the plunger 15 with respect to the discharge orifice 13, whereby flow of glass through the orifice and size of suspended gobs or charges may be controlled.

For the purpose of rotating the plunger 15, I preferably employ an electric motor 23 which rotates bevel gears 24, one of the latter being fixed to the lower end of a vertical shaft 25 whose upper end has splined connection to a sprocket wheel 26. Trained over this sprocket wheel 26 is a sprocket chain 27 which is also trained over a second sprocket wheel 28 adapted for rotation with a spur gear 29 whose teeth mesh with those of a relatively large spur gear 30 fixed to the upper end of the aforementioned stem or post 21. These two spur gears and the sprocket wheels are carried by the carrier bracket 16 and are adjusted vertically therewith.

The use of a boot of standard length in feeding molten glass for the manufacture of various types and sizes of ware and the simultaneous use of glass of unusually high temperature is made possible through arranging external means adjacent the outer end of the discharge orifice for directing a cooling medium against the surfaces of an issuing column of glass, and periodically increasing the pressure of this cooling medium so that it coacts with the aforementioned plunger in retarding the discharge flow of glass from the boot.

As shown in Figs. 1, 3 and 4, I form in the upper side or face of a conventional form of bushing support or ring 33, a circular or disk-like recess or chamber 34 concentric with the discharge orifice 13 and adapted during the flow of molten glass from the boot to form an annular way about the discharging column for the passage of a cooling medium. As in the ordinary construction, a removable bushing 35 is threaded into the ring 33 and is provided with a discharge orifice 35' axially aligned with the discharge orifice 13 in the boot 12. It will be noted by reference to Fig. 3, that the upper face of this removable bushing 35, incidentally forms a portion of the lower wall of the chamber 34. Entry to the chamber 34 of a cooling medium, as air, steam or other fluid, or, in some instances, a heating medium such as a flame of fuel gas,—is allowed through the formation of an inlet 36 substantially tangentially disposed with respect to the peripheral wall of the chamber, such disposition being preferred so that the incoming medium is directed in a substantially circular path about and in contact with the column of glass passing through the chamber. An outlet 37 is preferably arranged substantially parallel with the inlet 36 and in proximity to the latter, so that the injected medium will travel the entire distance around the column of discharging glass before it is expelled from the chamber.

In order that the medium which has become heated may be expelled and permit replacement by incoming cooled air without the formation of excessive pressure, a baffle 38 is extended into the chamber and operates to deflect the heated air to the outlet 37. A valve 39 is arranged in the outlet 37 in order that too rapid expulsion of the medium may be avoided. A conduit 40 provides means for supplying cooling or heating medium under pressure to the chamber 34, the pressure of the medium within the chamber being determined by the extent to which a control valve 41 is opened.

Periodic and substantial increase in the pressure of the cooling or heating medium within the chamber 34 is desired and is effected by arranging upon the outer end of the stem 42 of the valve 41, a roller 43 which bears upon the periphery of a cam 44, this cam being fixed to the upper end of a shaft 45 whose lower end mounts a bevel gear 46 adapted to be rotated by connection with a horizontal shaft 47, which, in turn, is driven by the electric motor 8 through bevel gears 48.

In the production of suspended gobs or charges of molten glass with the apparatus just described, the glass may be fed to the discharge orifice 13 at substantial furnace heat and consequently in a highly fluent condition, and passes through the annular passageway about the lower end of the control plunger 15 and then in a column through the chamber 34 and the discharge orifice 35' in the bushing 35.

During passage of the column of molten glass through the chamber 34, the outer surfaces are subjected to a cooling or chilling action by a cooling medium entering the chamber and circulating about the glass. Periodically, the cam 44 assumes a position to entirely open the valve 41 and consequently admits of a material increase in the pressure of the medium within the chamber by reason of which, that portion of the column of glass transversely aligned with this chamber 34 is constricted and flow of the glass above the chamber is retarded. Such constriction of this portion of the glass will also affect the issued and surface cooled portion below the chamber in that the flow of glass past the constricted area being interrupted or retarded, the glass therebeneath will draw down by its own weight, thereby necking in the charge for cutting by the severing means 49.

It will thus be seen that where a cooling medium is injected into the chamber 34, it primarily serves the purpose of forming an encasing film or layer over the column of issuing glass assisting in the control of and allowing use of molten glass of high temperature, and additionally acts periodically to retard flow of molten glass to the chamber 34 and from the orifice in the bushing 35.

Synchronized operation of the cooling medium injector and the gob or charge severing means, is attained by forming the valve actuating cam 44 so that it rotates once during the period required for moving one mold from a position to receive a gob or charge of molten glass, to a point whereat the next adjacent mold is ready to receive a charge. Except during the charging of a mold, the pressure is relatively low so flow is not retarded, but with alignment of a mold and the outlet, the cam 44 acts to completely open the valve 41 and allows application of flow retarding pressure to the glass. At this point, the cam 7' effects operation of the severing means 49, which cuts a gob or charge of glass from the issued portion. It is understood that each mold has associated therewith, a cam 7' which periodically causes actuation of the severing means during the period of application of maximum pressure to the issuing column of glass.

In applying my invention to apparatus including a reciprocating feed control plunger, the elimination of periodic increase and decrease of pressure of cooling or heating medium which acts upon the issuing column of glass, is made possible. As shown in Figs. 5 to 7, inclusive, I may associate my device with a glass feeding boot 12 having a submerged discharge orifice 13 through which molten glass is issued by gravity and severed into gobs or charges by suitable cutters 49', and then delivered to the blank molds of a rotary mold carriage 7. Rotary motion is transmitted to this carriage 7 from the electric motor 8 by way of bevel gears 9 and a spur gear 10 whose teeth mesh with those of a ring gear 11 suitably arranged upon the base portion of said carriage.

In order that the reciprocating plunger 15' may be readily adjusted with respect to the discharge orifice 13 and under certain conditions entirely removed from the boot 12, I provide a forwardly extending carrying bracket 16' whose inner end is supported by and guided in opposed vertical guide bars 18, while its outer end forms a bearing for a stem 21' rising vertically from a chuck 20' in which the upper end of the reciprocable plunger 15' is removably fixed.

Vertical movement of the carrier bracket 16', is possible as a result of providing a rack 18' at its inner end, and meshing with the teeth of this rack, the teeth of a spur gear 19 which is fixed for rotation with a transverse shaft 19'. This shaft may be rotated by means of a handle at one end, and at any desired period of rotation, a pawl and ratchet mechanism 17' may be brought into play for the purpose of setting the bracket 16' at a predetermined elevation. This structure primarily provides means facilitating replacement of plungers, though it may serve to permit adjustment of the plunger with respect to the discharge orifice.

In order that the plunger 15' may be periodically reciprocating in synchronism with operation of associated mechanisms, shafts 25' are driven by the mold carriage rotating motor 8, one of these shafts having its upper end portion journalled in a bearing 50, extending laterally from one side of the carrier bracket 16' and having splined connection above the bearing 50 with a bevel gear 51 whose teeth mesh with those of a bevel gear 52 fixed to one end of a relatively short horizontal shaft 53. This shaft 53 has its ends journalled in bearings formed upon the bracket 16', and mounts a cam 54 upon whose periphery bears a roller 55 carried at the outer end of an arm 56 which, in turn, is fixed to a rock shaft 57 disposed slightly above the aforementioned shaft 53 and in parallelism therewith. At the end of the rock shaft 57 opposite the arm 56, is a rocker arm 58, which projects forwardly and is connected by a link 59 to the upper end of the plunger carrying stem 21'.

It will thus be seen that simultaneously with rotation of the mold carriage 7, rotary motion is transmitted through the several shafts 25' to the cam carrying shaft 53, and at this point the mechanism, including the arm 56 and rocker arm 58, changes the rotary motion to a reciprocatory movement by means of which the plunger 15' is periodically raised and lowered. At the time operation of the apparatus is started, it is essential that the plunger 15' move downwardly at a predetermined period to discharge molten glass into a mold which, at said predetermined period, is vertically aligned with the discharge outlet, by reason of which I have interposed at the junction of two of the shafts 25', a clutch mechanism 26' which may be thrown out of operation so as to permit relative adjustment of the several elements with respect to each other and then thrown into operative position to allow reciprocation of the plunger 15' by means of the motor 8. It is understood that this clutch 26' is of such form that reciprocation of the plunger 15', in synchronism with operation of the associated elements, may be readily and accurately effected.

Due to the periodic reciprocation of the plunger 15' in synchronism with other mechanisms, properly timed intermittent retardation of the glass flow to the discharge orifice 13 is effected, by reason of which it is possible and preferable to eliminate the cam actuated pressure control valve from the conduit for the cooling or heating medium.

It will be noted that the means for applying a cooling or heating medium to the surface of the issuing column of glass in this instance, includes a bushing support or ring 33, and a removable bushing 35 having a discharge orifice 35' spaced below and axially aligned with the main discharge orifice 13 formed in the bottom of the boot 12. A circular chamber 34 is formed in the upper face of the bushing support 33, concentric with the main discharge orifice 13, and is adapted to receive a cooling or heating medium from any suitable source by way of a conduit 40'. Pressure of the medium passing through this pipe 40' may be controlled by means of a manually operable valve 60.

In operation, it is understood that when molten glass is issuing through a discharge orifice 13 and the orifice 35' in the bushing 35, the surface may be cooled by contact with a cooling medium which is injected into the chamber 34. Due to the circular form of the chamber 34 and the substantially tangential relation of the inlet, the medium is directed in a circular path about and in contact with the column of issuing glass and forms an encasing film or layer, by reason of which positive control of the flow of glass of unusually high temperature and accurate formation of suspended gobs or charges is attainable.

In the application of my invention as disclosed in Fig. 5, it is intended that the cooling medium be applied to the surface of the issuing glass or other material at comparatively low pressure and merely for the purpose of causing a sudden change in the temperature and density of such column. Such chilling results in the formation of an outer layer or coating enveloping the issued glass; permits the flow to be controlled and the formation of suspended charges of glass to be effected and controlled when the glass, as it issues, is at a high temperature and in a state of liquefaction so that it otherwise would be entirely beyond control.

Manifestly, certain changes in structural details may be resorted to as may fall within the spirit and scope of the appended claims.

What I claim is:

1. The method of producing formed charges of molten glass which comprises causing the glass to issue from an outlet orifice, periodically constricting the column of issuing glass by the application of pneumatic pressure surrounding the glass, and periodically severing the column of glass below the constriction to form charges.

2. The method of producing formed charges of molten glass which comprises causing the glass to flow from a supply body through an outlet orifice, applying pneumatic pressure to a surface of the glass beneath said orifice, confining the pressure to a narrow annular surface between the main body of the issued glass and the walls of the orifice, and periodically severing the column of glass below the point of application of pneumatic pressure, to form charges.

3. The method of forming charges of molten glass which comprises causing glass to issue from a container through a bottom outlet orifice, passing the glass through a pressure chamber before it is separated from the supply body, periodically necking in the glass by a periodic increase in the pressure within said chamber, and periodically severing the column of glass below the pressure chamber, to form charges.

4. The method which consists in issuing a stream of molten glass, directing a cooling medium in a circular path about and in contact with the surfaces of the glass at its point of issue with sufficient force to constrict said stream, and periodically severing the issued portions below the point of application of the cooling medium to form charges.

5. The combination of a container having a molten glass outlet, means for continuously directing and periodically increasing the pressure of a cooling medium against glass at its point of issue from the outlet, and means for periodically severing charges from the issued, surface cooled portions at a point spaced below the first named means.

6. In an apparatus of the character described, a feeder having a submerged molten glass discharge orifice, a bushing support arranged about the discharge end of the orifice, said support having a chamber concentric and communicating with the the discharge end of said orifice, means for directing a cooling medium into the chamber for contact with an issuing column of glass, and means for periodically severing charges of glass below the support.

7. In an apparatus of the character described, a feeder having a molten glass outlet, a bushing support arranged about the discharge end of the outlet, said support having a chamber concentric and communicating with the discharge end of the outlet, means for directing a cooling medium into the chamber and against issuing glass, means for periodically increasing pressure of the cooling medium for chilling the surfaces and intermittently retarding issue of glass through the outlet, and means for periodically severing charges from the issued portion.

8. In an apparatus of the character described, a feeder having a submerged molten glass outlet, a chamber communicating with and surrounding the discharge end of the outlet, means for continuously injecting a cooling medium into the chamber, cam actuated valve means for periodically increasing and decreasing the pressure of the cooling medium, and means for periodically severing charges from the issued portion at a point below said chamber.

9. In combination, a feeder having a molten glass outlet, means for controlling issue of glass through the outlet, said feeder having a chamber concentric with and directly communicating with the discharge end of the outlet, means for continuously directing a cooling medium into the chamber in a circular path about and in contact with the issuing glass, and means for periodically severing charges from the issued portion at a point spaced from said chamber.

10. In combination, a forming machine, a feeder having a discharge outlet, charge severing means between the feeder and forming machine, means interposed between the charge severing means and the feeder for directing a cooling medium against the surfaces of the material issued from the feeder, and means for periodically increasing pressure of the cooling medium to cause retardation of issuance of glass.

11. Glass feeding apparatus comprising the combination of a container for molten glass having a bottom outlet opening through which the glass issues, means providing a chamber beneath the outlet through which the glass flows, continuously operating means for producing a periodically varying pneumatic pressure of cooling medium within said chamber by which the glass is periodically constricted and the glass surface temperature is changed, and shearing means operable periodically in synchronism with the variations in the pneumatic pressure, to sever the glass at a plane spaced below said chamber.

12. The method which consists in causing issuance of molten glass through a submerged outlet, directing a cooling medium of periodically increasing and decreasing pressure against the surface of the issuing glass, confining said pressure to a narrow zone surrounding the glass, and periodically severing the issued portions at a point spaced below said zone to form charges.

13. The method which consists in issuing a stream of molten glass substantially at furnace temperature, passing said stream through a narrow zone containing a cooling medium surrounding and in contact with the glass, periodically increasing and decreasing the pressure of the medium on the glass, and periodically severing the issued portions at a plane spaced below the point of application of pressure, to form charges.

Signed at Toledo, in the county of Lucas and State of Ohio, this 19th day of March, 1926.

LEONARD D. SOUBIER.